(12) United States Patent
Du et al.

(10) Patent No.: US 11,567,362 B2
(45) Date of Patent: Jan. 31, 2023

(54) LIGHT GUIDE ASSEMBLY, LIGHT SOURCE MODULE AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Jingjun Du, Beijing (CN); Lingyu Sun, Beijing (CN); Xiuyun Chen, Beijing (CN); Fei Liang, Beijing (CN); Liyu Fang, Beijing (CN); Tingxiu Hou, Beijing (CN); Peng Zhong, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 216 days.

(21) Appl. No.: 16/955,935

(22) PCT Filed: Aug. 2, 2019

(86) PCT No.: PCT/CN2019/099105
§ 371 (c)(1),
(2) Date: Jun. 19, 2020

(87) PCT Pub. No.: WO2021/022418
PCT Pub. Date: Feb. 11, 2021

(65) Prior Publication Data
US 2022/0137442 A1    May 5, 2022

(51) Int. Cl.
*G02F 1/13357* (2006.01)
*F21V 8/00* (2006.01)

(52) U.S. Cl.
CPC ......... *G02F 1/1336* (2013.01); *G02B 6/0031* (2013.01)

(58) Field of Classification Search
CPC .......................... G02F 1/1336; G02B 6/0031
See application file for complete search history.

(56) References Cited

U.S. PATENT DOCUMENTS

| 10,353,244 B2* | 7/2019 | Ou ..................... G02F 1/133615 |
| 2012/0026430 A1* | 2/2012 | Chen .................... G02B 6/0018 |
| | | 362/609 |

(Continued)

FOREIGN PATENT DOCUMENTS

| CN | 101153991 A | 4/2008 |
| CN | 101876404 A | 11/2010 |

(Continued)

OTHER PUBLICATIONS

Written Opinion for International Application No. PCT/CN2019/099105 dated Apr. 23, 2020.

*Primary Examiner* — Kevin Quarterman
(74) *Attorney, Agent, or Firm* — Xsensus LLP (57) ABSTRACT

A light guide assembly includes a light guide plate and a light guide strip around the periphery of the light guide plate, where a plurality of light-transmitting holes are formed on one side of the light guide strip facing to the light guide plate, and at least one end of the light guide strip is an light incident side. The light is incident to the inside of the light guide strip from the light incident side, and then is incident into the light guide plate from the light-transmitting holes on the side of the light guide strip, and thus becomes a surface light source.

15 Claims, 5 Drawing Sheets

(56) References Cited

U.S. PATENT DOCUMENTS

| | | | |
|---|---|---|---|
| 2015/0103393 A1* | 4/2015 | Huang | G02F 1/167 359/296 |
| 2019/0154906 A1* | 5/2019 | Lee | G02B 6/0031 |
| 2019/0212486 A1* | 7/2019 | Ahn | G02B 6/005 |
| 2020/0132928 A1* | 4/2020 | Lyu | G02B 6/00 |

FOREIGN PATENT DOCUMENTS

| | | |
|---|---|---|
| CN | 202049307 U | 11/2011 |
| CN | 104747937 A | 7/2015 |
| JP | 2009199971 A | 9/2009 |

* cited by examiner

LIGHT GUIDE ASSEMBLY, LIGHT SOURCE MODULE AND DISPLAY DEVICE

CROSS REFERENCE TO RELATED APPLICATION

This application is a § 371 national phase application based upon, and claims priority to, PCT Patent Application No. PCT/CN2019/099105, filed on Aug. 2, 2019, the contents of which being incorporated by reference in their entirety herein.

TECHNICAL FIELD

This disclosure relates to a displaying technical field, in particular to a light guide assembly, and also relates to a light source module and a display device, which include the light guide assembly.

BACKGROUND

A front light source is a novel light source for display panels, such as a reflective display panel, a semi-reflective and semi-transparent display panel, a transparent display panel, an electronic paper display panel or the like, which is different from the traditional backlight source. The displaying technology of such kind is a displaying technology that does not need backlight and directly acts as a screen light source by reflecting ambient light, in which the front light source is added into a top portion of the display panel to make display brightness better, and even when the ambient light is insufficient, the screen can be seen clearly, thus a good display effect can be realized.

The front light source is located at the top portion of the display panel and needs to have higher light transmittance, as such, the structures such as a reflective sheet, a diffusion sheet, a prism sheet and the like commonly used in the backlight sources cannot be added, thus making it difficult to ensure uniformity of light after emitting in the light guide plate, and further unable to ensure the uniformity and consistency of the displaying effect.

It should be noted that the information in the above background section is only for enhancing the understanding of the background of the present disclosure, and therefore may include information that does not constitute prior art known to those of ordinary skill in the art.

SUMMARY

According to one aspect of the present disclosure, a light guide assembly is provided, and includes:

a light guide plate;

a light guide strip, being around a periphery of the light guide plate and having a first end and a second end, where a plurality of light-transmitting holes are formed on one side of the light guide strip facing to the light guide plate; and at least one of the first end and the second end is a light incident side.

In an exemplary embodiment of the present disclosure, the light guide strip is annularly, and the shape of the light guide strip is the same as the shape of the periphery of the light guide plate.

In an exemplary embodiment of the present disclosure, the light guide strip includes:

a light-transmitting part having a light-transmitting medium;

a reflective layer wrapping the light-transmitting part;

where a plurality of the light-transmitting holes include a plurality of first light-transmitting holes on one side of the reflective layer facing to the light guide plate, and the first light-transmitting holes have light-transmitting mediums.

In an exemplary embodiment of the present disclosure, the light guide strip further includes:

a protective layer wrapping the reflective layer;

where a plurality of the light-transmitting holes further include a plurality of second light-transmitting holes on one side of the protective layer facing to the light guide plate, and the second light-transmitting holes have light-transmitting mediums; and a projection of each of the first light-transmitting holes and a projection of one of the second light-transmitting holes in a radial direction of the light guide strip overlap.

In an exemplary embodiment of the present disclosure, the first end of the light guide strip is a light incident side, where, a plurality of the first light-transmitting holes are equally spaced in a light transmission direction of the light guide strip, and sectional areas of a plurality of the first light-transmitting holes in a direction parallel to the periphery of the light guide plate gradually increase in a direction away from the first end;

or, the sectional areas of a plurality of the first light-transmitting holes in a direction parallel to the periphery of the light guide plate are equal, and a distance between the first light-transmitting holes adjacent to each other in a light transmission direction of the light guide strip gradually decreases in a direction away from the first end.

In an exemplary embodiment of the present disclosure, both the first end and the second end of the light guide strip are light incident sides, where, a plurality of the first light-transmitting holes are equally spaced in a light transmission direction of the light guide strip, and sectional areas of the first light-transmitting holes in a direction parallel to a periphery of the light guide plate gradually increase in a direction close to a middle point of the light guide strip;

or, the sectional areas of a plurality of the first light-transmitting holes in a direction parallel to the periphery of the light guide plate are equal, and a distance between the first light-transmitting holes adjacent to each other in a light transmission direction of the light guide strip gradually decreases in a direction close to the middle point of the light guide strip.

In an exemplary embodiment of the present disclosure, the light-transmitting medium of the light-transmitting part is a gas medium or a solid medium, the light-transmitting mediums of the first light-transmitting holes are gas mediums or solid mediums, and the light-transmitting mediums of the second light-transmitting holes are gas mediums or solid mediums.

In an exemplary embodiment of the present disclosure, the light-transmitting mediums of the light-transmitting part, the first light-transmitting holes and the second light-transmitting holes are the same solid medium.

In an exemplary embodiment of the present disclosure, the first light-transmitting holes and the second light-transmitting holes are strip-shaped holes, and an extension direction of a length of the strip-shaped hole is perpendicular to a plane of the light guide plate.

In an exemplary embodiment of the present disclosure, there are zig-zag notches on the surface of the light guide plate facing to the light guide strip, and an extension direction of the zig-zag notches is perpendicular to a plane of the light guide plate.

In an exemplary embodiment of the present disclosure, the light-transmitting mediums of the light-transmitting part, the first light-transmitting holes and the second light-transmitting holes are solid mediums, the light-transmitting mediums of the second light-transmitting holes have zig-zag notches on the surface close to one side of the light guide plate, and an extension direction of the zig-zag notches is perpendicular to a plane of the light guide plate.

In an exemplary embodiment of the present disclosure, the light-transmitting mediums of the light-transmitting part, the first light-transmitting holes and the second light-transmitting holes are solid mediums, the light-transmitting mediums of the second light-transmitting holes have zig-zag notches on the surface close to one side of the light guide plate, the surface of the light guide plate facing to the light guide strip also has zig-zag notches, an extension direction of the zig-zag notches is perpendicular to a plane of the light guide plate, and the zig-zag notches of the second light-transmitting holes and the zig-zag notches of the light guide plate are opposite to one another in a concave-convex manner.

In an exemplary embodiment of the present disclosure, a side of the light guide strip facing to one side of the light guide plate is a plane and closely attaches to a side wall of the light guide plate.

In an exemplary embodiment of the present disclosure, the light guide plate has a through hole.

According to another aspect of the present disclosure, a light source module is provided, and includes a light source and the above light guide assembly, where the light source is on at least one end of the light guide strip, and a light-emitting direction of the light source faces the light guide strip.

According to a further aspect of the present disclosure, a display device is provided, and includes a display panel and the light source module as above mentioned.

In an exemplary embodiment of the present disclosure, the display panel is a total reflective display panel, a semi-reflective and semi-transparent display panel, or a transparent display panel;

the display panel includes an array substrate, a liquid crystal layer and a color film substrate sequentially stacked, and the light guide plate covers one side of the color film substrate far away from the liquid crystal layer.

In an exemplary embodiment of the present disclosure, the display panel is an electronic paper display panel.

It should be understood that both the foregoing general description and the following detailed description are exemplary and explanatory only and are not restrictive of the disclosure.

BRIEF DESCRIPTION OF THE DRAWINGS

The accompanying drawings herein, which are incorporated in and constitute a part of this specification, illustrate embodiments in accordance with the present disclosure, and together with the description, serve to explain the principles of the present disclosure. Understandably, the drawings in the following description are merely for illustrating some embodiments of the present disclosure. Those ordinary skilled in the art can also derive other drawings based on the mentioned drawings without paying any creative labor.

DETAILED DESCRIPTION

Now, the exemplary implementations will be described more completely with reference to the accompanying drawings; however, the exemplary implementations can be done in various forms and should not be construed as limiting the implementations as set forth herein. Instead, these implementations are provided so that the present disclosure will be thorough and complete, and concept of the exemplary implementation will be fully conveyed to those skilled in the art. Same reference numbers denote the same or similar structures in the figures, and thus the detailed description thereof will be omitted.

In the traditional backlight structure, the light is emitted from a LED strip, a light source is transformed into a surface light source through dots on the light guide plate, utilization efficiency of the light can be improved through reflection of the reflection sheet, and uniformity and collimation of the light can be further improved through light uniform and light concentration of the diffusion sheet and the prism sheet, and ultimately the quantity and intensity uniformity of the light irradiating the panel can be maximized. In a front light source, the light emitted from the side-in LED strip can form a light beam after entering the light guide plate; however, in order to ensure light transmittance, structures such as the reflection sheet, the diffusion sheet and the prism sheet cannot be added, and thus it is difficult to ensure the uniformity of light. In order to improve the uniformity of light, it is necessary to arrange the LED light source in a place away from the light guide plate as far as possible to increase a light mixing distance, and thereby increase a volume of the front light source, and further increase a volume of an entire display panel frame.

In the drawings, the following reference numerals denote corresponding components: light guide plate 1; light guide strip 2; light source 3; array substrate 4; liquid crystal layer 5; color film substrate 6; polarizer 7; optical adhesive 8; flexible circuit board 9; through hole 10; light-transmitting hole 21; light-transmitting part 22; reflective layer 23; protective layer 24; zig-zag notch 25; first light-transmitting hole 211; and second light-transmitting hole 212.

Figure 1:
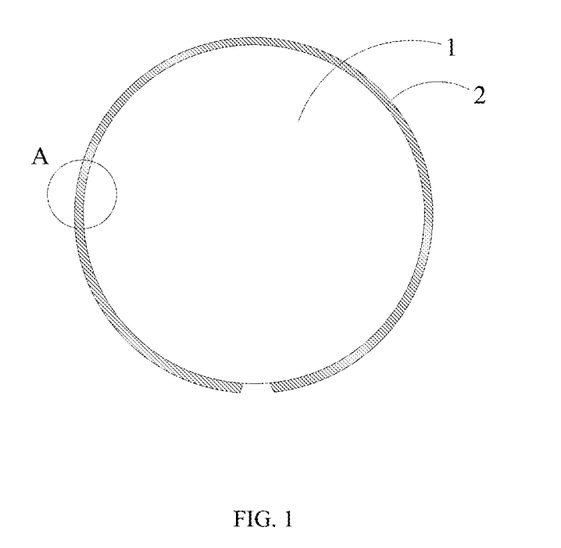
FIG. 1 is a top view of a light guide assembly according to an embodiment of the present disclosure.
Figure 2:
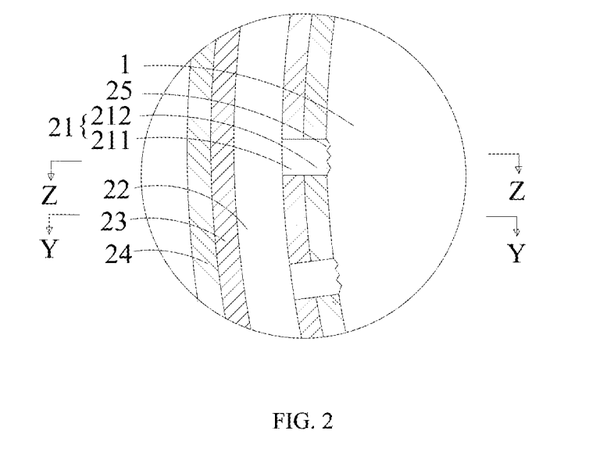
FIG. 2 is a partial enlarged view of part A in FIG. 1.

A light guide assembly is provided in an embodiment of the present disclosure. The light guide assembly can provide uniform light without structure such as reflection sheets, diffusion sheets, prism sheets and the like. As shown in FIGS. 1-2, specifically, the light guide assembly according to the embodiment of the present disclosure includes a light guide plate 1, and a light guide strip 2 arranged at a periphery of the light guide plate 1. The light guide strip 2 includes a first end and a second end. A plurality of light-transmitting holes 21 are opened on one side of the light guide strip 2 facing to the light guide plate 1. At least one end of the light guide strip 2 is a light incident side.

In this embodiment, the light guide plate 1 may be the conventional optical grade acrylic or PC sheet, on one side of which light guide points are printed. The light incident on the light guide plate 1 are completely reflected from the light guide plate 1. When the light are irradiated onto the light guide points, reflective light can be diffused to various angles, and then by breaking the reflection condition, can be emitted from a light emitting surface of the light guide plate 1. The light emitting surface of the light guide plate 1 may be an upper surface or a lower surface. In addition, the light guide plate 1 may be circular, rectangular or in any other shapes; however, the present disclosure is not particularly limited thereto.

The light guide strip 2 is strip-shaped as a whole, and surrounds the light guide plate 1 in the same shape as that of the light guide plate 1. The light guide strip 2 has a radial section in a circular, rectangular, polygonal or any other shape. A periphery of the light guide plate 1 can be surrounded by only one longer light guide strip 2 or a plurality of shorter light guide strips 2 spliced end to end.

The light may be incident from only one end of the light guide strip 2 or from both ends of the light guide strip 2 simultaneously. As both the first end and the second end of the light guide strip 2 are used as light incident sides of the light, a light source 3 is arranged at both ends. As only one end of the light guide strip 2 is used as the light incident side of the light, the light source 3 is arranged only at one end of the light incident side, and the other end needs to be closed to prevent the light from leaking out. Both of the ends are used as the light incident sides, which can make the light in the light guide strip more sufficient.

Various light-transmitting holes 21 on the light guide strip 2 may be several independent light-transmitting holes or may be communicated to be an integral through groove. By adopting the former structure, the structures of respective light-transmitting holes may be flexibly adjusted as required, and the overall structure of the light guide strip is firmer and more stable. The sectional shape of the light-transmitting hole 21 in a direction parallel to the periphery of the light guide plate 1 may be various shapes such as circular, rectangular, triangular.

In the light guide assembly of this embodiment, the light emitted from each of light-transmitting holes 21 may be regarded as a new light source. The number, spacing, aperture of the light-transmitting holes 21 can affect the uniformity of the emitted light, and thereby being set as required, that is, the more the number of the light-transmitting holes 21, the smaller the spacing, and the more uniform the light incident on the light guide plate 1. At the same time, an intensity of light emitted from a single light-transmitting hole 21 is weaker than the intensity of the light of the LED light source, and a light beam formed thereby is smaller; moreover, the light-transmitting holes 21 arranged closely make the light mixed fully, and do not need a larger light mixing distance, so that possibility to generate the light beam is greatly reduced, and uniformity of the picture is better. Furthermore, since the light are incident onto the light guide plate 1 circumferentially, the uniformity of the picture is better than that of the side light source having the light incident on only one side. Further, since the light guide assembly has good uniformity of the light, does not need a large light mixing distance, and occupies a small volume, the size of a of the panel can be reduced, thereby realizing a narrow frame design.

Hereinafter, the light guide assembly according to the embodiment of the present disclosure will be described in detail.

In this exemplary embodiment, referring to FIG. 1, there is one light guide strip 2 annularly around the periphery of the light guide plate 1, and a gap for setting a light source is reserved between the first end and the second end of the light guide plate 1. One light guide strip is used to realize the light-transmitting, and also simplify the structure of the whole light guide assembly.

Figure 3:
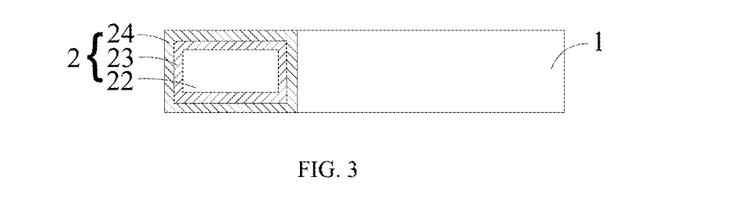
FIG. 3 is a sectional view of a light guide strip and a light guide plate in FIG. 2 in a Y-Y direction.
Figure 4:
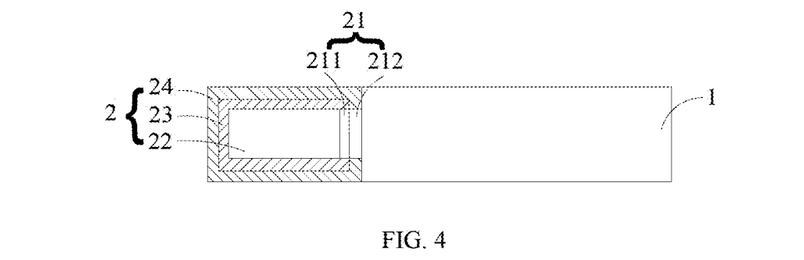
FIG. 4 is a sectional view of the light guide strip and the light guide plate in FIG. 2 in a Z-Z direction.

Referring to FIGS. 3-4, when the side on one side of the light guide strip 2 facing to the light guide plate 1 is a plane, the side may be tightly attached to a side wall of the light guide plate 1, so that the light emitted from the light-transmitting holes 21 can totally enter the light guide plate 1 and avoid light leakage. Specifically, the shape of the light guide strip 2 may be a rectangle as shown in the figure, and the right side of the rectangle is closely combined with the periphery of the light guide plate. Certainly, in other embodiments, other shapes are also possible and here will not be listed individually.

Figure 5:
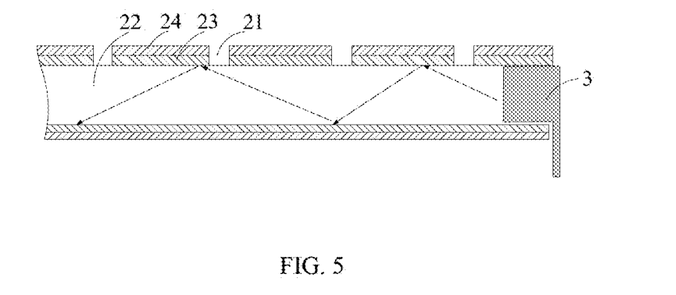
FIG. 5 is a schematic view of transmission of light in the light guide strip.

In this exemplary embodiment, referring to FIGS. 3-5, the light guide strip 2 includes a light-transmitting part 22 in a strip shape, the outer wall of the light-transmitting part 22 is wrapped with a reflective layer 23, and one side of the reflective layer 23 facing to one side of the light guide plate 1 is provided with a plurality of first light-transmitting holes 211. Both the light-transmitting part 22 and the first light-transmitting holes 211 have light-transmitting mediums, and the light incident from a light incident side of the light guide strip 2 may transmit in the medium of the light-transmitting part 22 and may continuously be reflected by the reflective layer 23 surrounding the light-transmitting part 22, thereby realizing transmission of the light in the entire light guide strip 2. The reflective layer 23 can also avoid light loss during the light-transmitting to the greatest extent to make the light distribution of the entire light guide strip 2 more uniform. When the light reflect to the first light-transmitting holes 211, the light can be emitted from the light-transmitting mediums of the first light-transmitting holes 211 into the light guide plate 1. The reflective layer 23 may be made of any material with a function of reflecting the light, such as metal, and the present disclosure does not particularly limit thereto. The sectional shape of the first light-transmitting hole 211 in a direction parallel to the periphery of the light guide plate 1 may be various shapes such as circular, rectangular, triangular, etc.

In this exemplary embodiment, the light guide strip 2 further includes a protective layer 24 that wraps an outer wall of the reflective layer 23 to protect the reflective layer 23. A plurality of second light-transmitting holes 212 are provided on one side of the protective layer 24 facing the light guide plate 1; correspondingly, the second light-transmitting holes 212 also have light-transmitting mediums. Projections of the second light-transmitting holes 212 and the first light-transmitting holes 211 in a radial direction of the light guide strip are overlapped, so that light paths of the second light-transmitting holes 212 and the first light-transmitting holes 211 are communicated in the radial direction of the light guide strip. The projections of the second light-transmitting holes 212 and the first light-transmitting holes 211 may overlap completely or partially as long as the second light-transmitting holes 212 and the first light-transmitting holes 211 are communicated. Understandably, when the projections of the second light-transmitting holes 212 and the first light-transmitting holes 211 are completely overlapped, there is more light passing into the light guide plate 1 through the light-transmitting part 22. The protective layer 24 may be made of bendable materials such as plastics and rubbers, which are bendable according to the shape of the light guide plate 1 to adapt to various shapes of the light guide plate, and thus being highly suitable for special-shaped light guide plates.

In this exemplary embodiment, the light-transmitting part 22, the first light-transmitting holes 211 and the second light-transmitting holes 212 have the same light-transmitting mediums, so that the light can transmit in the entire light-transmitting area according to the same characteristics, and thus facilitate controlling the light emitting effect. The light-transmitting medium can be a gaseous medium such as air, which has the highest transmittance and can realize the transmission of light better. The light-transmitting medium may also be a solid medium such as polycarbonate (PC) or polyethylene terephthalate (PET), etc., which has better light transmittance and also is bendable to adapt to the various shapes of the light guide plate 1. Using air as the light-transmitting medium can save the materials. Openings are made on the reflective layer 23 and the protective layer 24 to form the first light-transmitting holes 211 and the second light-transmitting holes 212; however, it is necessary that the reflective layer 23 can be formed by spraying it on the inner wall of the cylindrical protective layer 24, and this preparation process is more complicated. Using solid as the light-transmitting medium can simplify the preparation process of the reflective layer 23, that is, the reflective layer 23 can be formed by directly spraying the reflective material onto the outer wall of the medium of the light-transmitting part 22.

Since the light is incident to the inside from end points of the light guide strip 2 and is transmitted, and loss of the light may occur during the transmission, the light close to the end points of the light guide strip 2 is more sufficient than that far away from the end points. Both the spacing and the sectional area of the first light-transmitting holes 211 and the second light-transmitting holes 212 affect light-emitting amount. By precisely controlling the structure of the light-transmitting holes 21, the light-emitting amount of the light guide strip 2 at the various position can be controlled.

Figure 6:
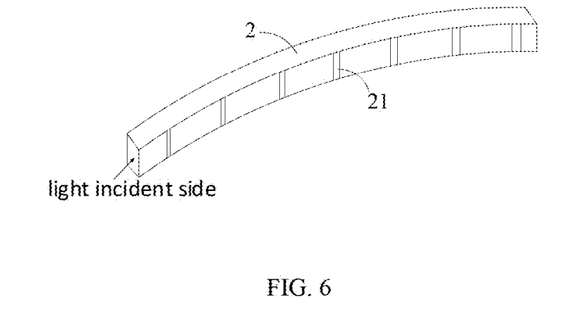
FIG. 6 is a schematic structural view of a light-transmitting hole on a light guide strip having incident light on one side.

As taking only the first end of the light guide strip 2 as the light incident side, in order to ensure the light incident onto the light guide plate 1 uniform, in an embodiment, referring to FIG. 6, all of the first light-transmitting holes 211 are equally spaced in the light transmission direction of the light guide strip 2, but the sectional area of the first light-transmitting holes 211 in a direction parallel to the periphery of the light guide plate 1 gradually increases in the direction away from the first end, so that the light emitted from the light-transmitting holes 21 gradually away from the light incident side is equal to that close to the light incident side. In another embodiment, referring to FIG. 7, all of the first light-transmitting holes 211 have the same sectional area in the direction parallel to the periphery of the light guide plate 1, but a distance between the two adjacent first light-transmitting holes 211 in the light transmission direction of the light guide strip 2 gradually decreases in the direction away from the light incident side, that is, the arrangement of the first light-transmitting holes 211 becomes more and more dense in the direction away from the light incident side. These two structures can make the light intensity of the respective light-transmitting holes 21 similar to make up for the light missed at the distal end, and thus make the light emitted by the entire light guide strip 2 more uniform. Similarly, the positions of the second light-transmitting holes 212 and the first light-transmitting holes 211 correspond to one another, which will not be further described herein.

Figure 8:
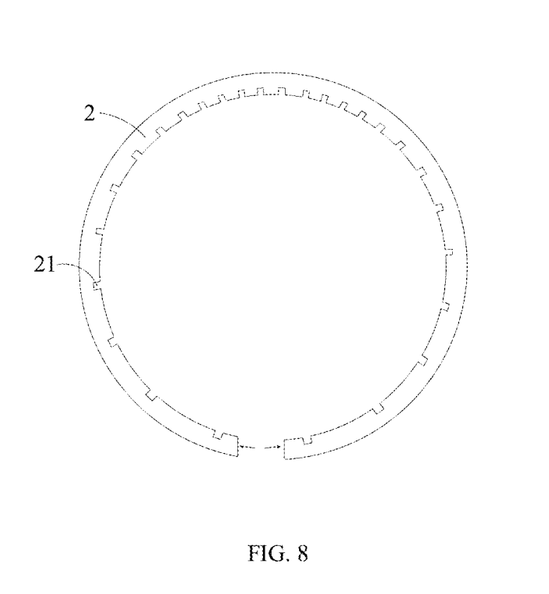
FIG. 8 is a schematic structural view of a light-transmitting hole on a light guide strip having incident light on both sides.
Figure 9:
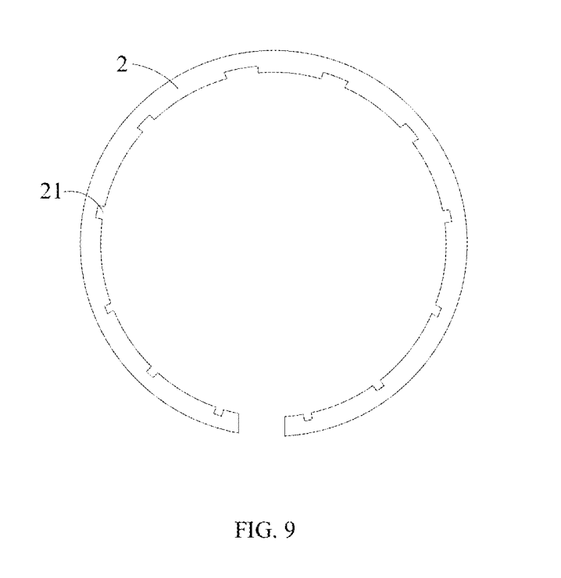
FIG. 9 is another structural view of a light-transmitting hole on a light guide strip having incident light on both sides.

As taking both the first end and the second end of the light guide strip 2 as the light incident sides, in an embodiment, referring to FIG. 9, all of the first light-transmitting holes 211 are equally spaced in the light transmission direction of the light guide strip 2, but the sectional area of the first light-transmitting holes 211 in the direction parallel to the periphery of the light guide plate 1 gradually increases in the direction close to a middle point of the light guide strip 2, that is, the sectional area gradually increases from the two end points of the light guide strip 2 to the middle point, so that the light emitted from the light-transmitting holes 21 gradually away from the light incident side is equal to that close to the light incident side. In another embodiment, referring to FIG. 8, all of the first light-transmitting holes 211 have the same sectional areas in the direction parallel to the periphery of the light guide plate 1, but the distance between the adjacent two first light-transmitting holes 211 in the light transmission direction of the light guide strip 2 gradually decreases in the direction close to the middle point of the light guide strip, that is, the arrangement of the first light-transmitting holes 211 becomes more and more dense in the position away from the two light incident sides. These two structures can make the light intensity of the respective light-transmitting holes 21 similar to make up for the light missed at the distal end, and thus make the light emitted by the entire light guide strip 2 more uniform. Similarly, the positions of the second light-transmitting holes 212 and the first light-transmitting holes 211 correspond to one another, which will not be further described herein.

Figure 7:
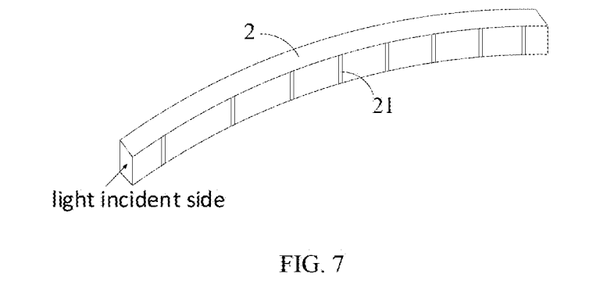
FIG. 7 is another schematic structural view of a light-transmitting hole on a light guide strip having incident light on one side.

In this exemplary embodiment, referring to FIGS. 6 and 7, the first light-transmitting holes 211 are strip-shaped holes, and the sections of the strip-shaped holes in the direction parallel to the periphery of the light guide plate 1 may be specifically in the shape of rectangular holes, oblong holes, or the like, and an extension direction of the length of the strip-shaped hole is perpendicular to the plane of the light guide plate 1. The strip-shaped holes vertically arranged relative to the light guide plate can provide sufficient light in a thickness direction of the light guide plate 1, so that the light can have different optical paths in the light guide plate 1 and the light can be emitted more uniformly. When the shapes of the second light-transmitting holes 212 and the first light-transmitting holes 211 are the same, the maximum light transmittance can be achieved, and the processing is convenient, but the specific shapes will not be further described.

In order to further improve uniformity of the light incident onto the light guide plate 1, referring to FIG. 2, according to the present exemplary embodiment, zig-zag notches 25 are provided on a contact surface between the light guide plate 1 and the light guide strip 2, and light beams emitted from the light-transmitting holes 21 are diffused through the zig-zag notches 25. Specifically, in an embodiment, the zig-zag notches 25 are provided on a side wall surface of the light guide plate 1 facing to the light guide strip 2, and the extension direction of the zig-zag notches 25 is a vertical direction perpendicular to the plane of the light guide plate 1. The light after traveling from the left side to the zig-zag notch 25 diffuses to both sides of the zig-zag notch 25 in the plane of the light guide plate 1. The diffused light can further improve the mixing degree of the light and thereby effectively improving the uniformity of the light. In another embodiment, when the light-transmitting medium of the light guide strip 2 is a solid medium, the zig-zag notch 25 is provided on the outer surface of the light-transmitting medium of the second light-transmitting hole 212, and the extension direction of the zig-zag notch 25 is a vertical direction perpendicular to the plane of the light guide plate 1, and the zig-zag notches 25 provided on the light guide strip 2 can also realize diffusion of the light. In yet another embodiment, when the light-transmitting medium of the light guide strip 2 is a solid medium, the zig-zag notches 25 may be simultaneously provided on the outer surfaces of the light-transmitting mediums of the second light-transmitting holes 212 and the side wall surface of the light guide plate, and the two zig-zag notches 25 are opposite to each other in a concave-convex manner, and cooperate with each other to realize diffusion of the light.

Figure 14:
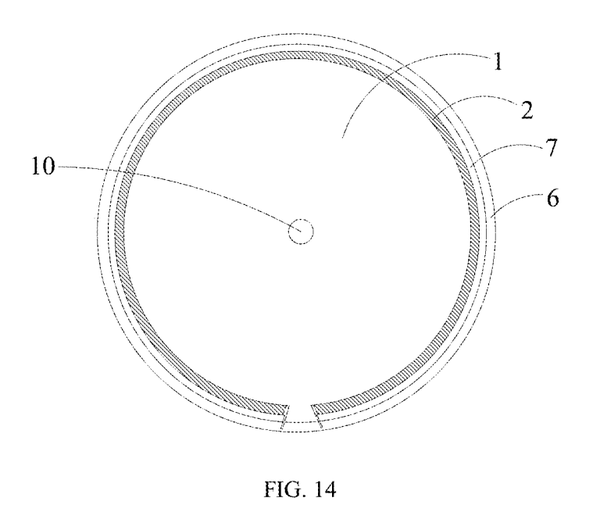
FIG. 14 is a top view of a display device having a through hole according to an embodiment of the present disclosure.

In this exemplary embodiment, the light guide plate 1 is provided with a through hole 10, which is provided for fixing other equipment, and a display panel is generally provided with a through hole matched thereto. For the conventional side incident light source, the light is incident only from one side of the light guide plate 1, and the light is blocked at the position of the through hole 10. Dark areas are formed on the side of the through hole 10 away from the side incident light source to cause a problem of uneven display. However, the light in the light guide assembly according to this embodiment is uniformly incident from the periphery of the light guide plate 1, so that the dark areas are not formed at the periphery of the through hole 10, and the picture effect is good.

Figure 10:
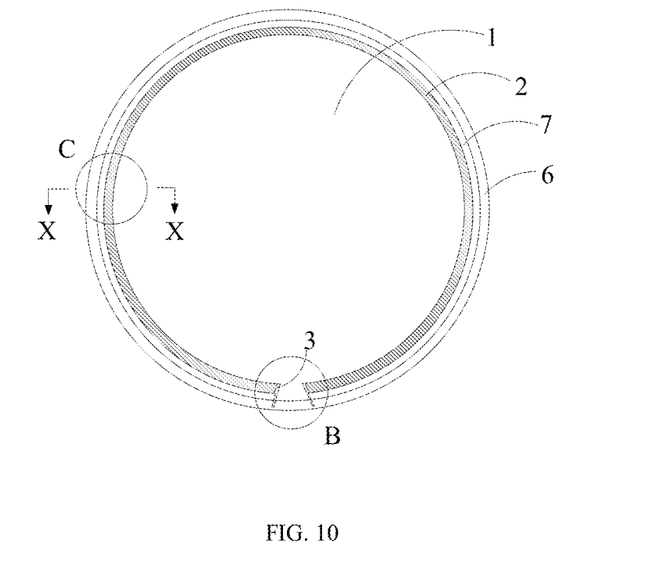
FIG. 10 is a schematic structural view of a display panel and a light source module according to an embodiment of the present disclosure.

The embodiment of the present disclosure also provides a light source module. Referring to FIG. 10, the light source module includes a light source 3 and the above light guide assembly, where the light source 3 is arranged on at least one end of the light guide strip 2, and a light-emitting direction of the light source 3 faces to the inside of the light guide strip 2.

Figure 11:
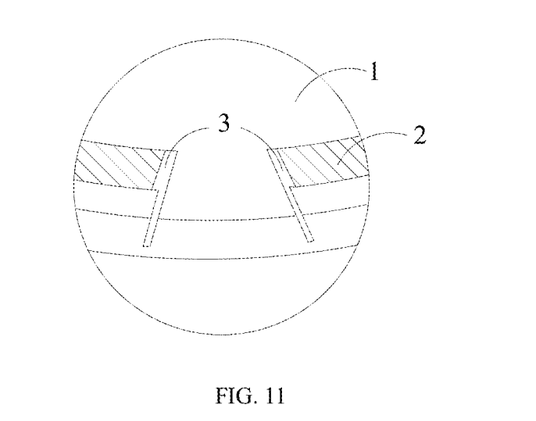
FIG. 11 is a partial enlarged view of part B in FIG. 10.
Figure 12:
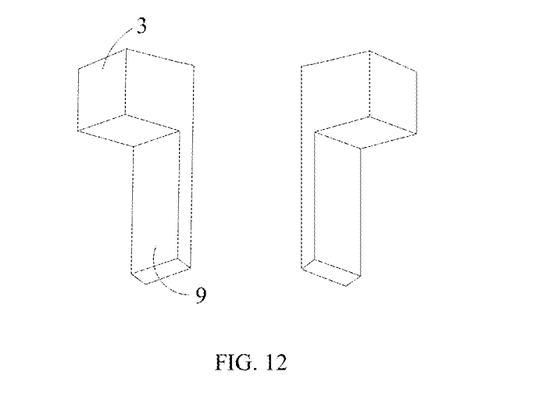
FIG. 12 is a schematic structural view of a light source.

The light source 3 may be an LED light source, as the light emitting source of the entire light source module, and may be powered by a flexible circuit board 9, as shown in FIGS. 11 and 12. The light source 3 may be only disposed on one end of the light guide strip 2, or may be disposed on both the first end and the second end of the light guide strip 2. The light emitted by the light source 3 is incident into the inside of the light guide strip 2 from at least one end of the light guide strip 2, and transforms from a point light source to a line light source after being transmitted inside the light guide strip 2. The light inside the light guide strip 2 is incident into the light guide plate 1 from the light-transmitting holes 21 on the side of the light guide strip, and thereby transforming from a line light source to a surface light source.

The light source module may be used as a front light source and is arranged above the display panel, and the light-emitting direction of the light guide plate 1 is downward. The light source module may also be used as a backlight and arranged under the display panel, and the light-emitting direction of the light guide plate 1 is upward. When the light source module is used as the front light source, the light guide plate 1 needs to be made of materials having greater light transmittance to avoid influence on the display.

The embodiment of the present disclosure also provides a display device, which includes a display panel and the above light source module. As the light source module of the present disclosure can provide more uniform and sufficient light and does not occupy a volume too large, the display device can have a better display effect, but also be suitable for narrower frames, and thereby meeting higher use requirement.

Figure 13:
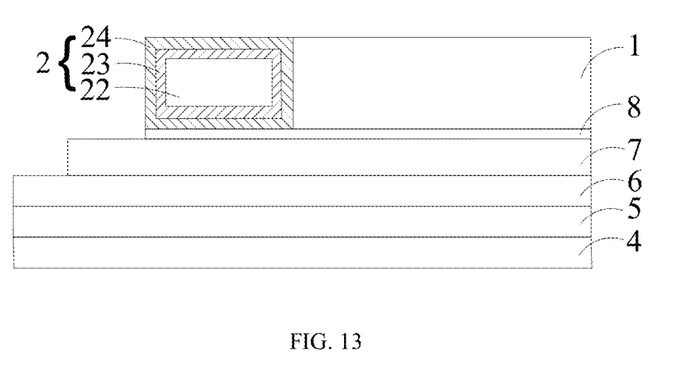
FIG. 13 is a sectional view of part C in FIG. 10 in a X-X direction.

In an embodiment, the display panel is a total reflective display panel, a semi-reflective and semi-transparent display panel, or a transparent display panel. These display panels have no backlight and generally suffer from poor brightness. The light source module of the present disclosure is arranged on the display panel as the front light source, which can provide more sufficient light for the display panel and improve the display effect. Specifically, referring to FIGS. 10 and 13, the above display panel includes an array substrate 4, a liquid crystal layer 5, and a color film substrate 6 stacked successively from bottom to top. The light guide plate 1 in the light guide assembly covers over the color film substrate 6. The light of the light guide plate 1 and the ambient light are incident into the panel from top to bottom, and that emitted after being reflected by the reflective layer of the display panel. Specifically, the light guide plate 1 is attached to an upper polarizer 7 disposed on the color film substrate by an optical adhesive 8.

In another embodiment, the display panel is an electronic paper display panel. The electronic paper display panel encapsulates black and white charged particles in a microcellular droplet structure, in which lifting movement of the black and white particles with different charges is controlled by an applied electric field to show a black and white monochrome display effect. Since the display panel has no backlight and displays only depending on the ambient light, there is also a phenomenon of poor brightness. The light source module of the present disclosure is arranged on the electronic paper display panel as a front light source, which can provide more sufficient light for the display panel and improve the display effect.

The present disclosure does not limit to the application field of the display device, which can be used for various display devices such as televisions, computers, mobile phones, electronic readers, watches, advertising billboards, and the like, which will not be listed individually here.

Although relative terms such as "above" and "under" are used herein to describe the relationship of one component relative to another component, such terms are used herein only for the sake of convenience, for example, in the direction shown in the figure, it should be understood that if the referenced device is inversed upside down, a component described as "above" will become a component described as "under". When a structure is described as "above" another structure, it probably means that the structure is integrally formed on another structure, or, the structure is "directly" disposed on another structure, or, the structure is "indirectly" disposed on another structure through an additional structure.

The terms "one", "a/an", "the", "this", and "at least one", are used to express the presence of one or more of the element, component, or the like. The terms "comprise", "include", and "have" are intended to be inclusive, and mean there may be additional elements, components, or the like other than the listed elements, components, or the like.

Other embodiments of the disclosure will be apparent to those skilled in the art from consideration of the specification and practice of the disclosure disclosed herein. This application is intended to cover any variations, uses, or adaptations of the disclosure following, in general, the principles of the disclosure and including such departures from the present disclosure as come within known or customary practice in the art to which the disclosure pertains. It is intended that the specification and examples be considered as exemplary only, with a true scope and spirit of the disclosure being indicated by the following claims.

What is claimed is:

1. A light guide assembly, comprising:
   a light guide plate; and
   a light guide strip being around a periphery of the light guide plate and having a first end and a second end, a plurality of light-transmitting holes being formed on one side of the light guide strip facing to the light guide plate;
   wherein at least one of the first end and the second end is a light incident side;
   the light guide strip is annular, and a shape of the light guide strip is the same as a shape of the periphery of the light guide plate;
   the light guide strip comprises:
      a light-transmitting part having a light-transmitting medium; and
      a reflective layer wrapping the light-transmitting part;
      wherein a plurality of the light-transmitting holes comprise a plurality of first light-transmitting holes on one side of the reflective layer facing to the light guide plate, and the first light-transmitting holes have light-transmitting mediums; and
   the light guide strip further comprises:
      a protective layer wrapping the reflective layer;
      wherein a plurality of the light-transmitting holes further comprise a plurality of second light-transmitting holes on one side of the protective layer facing to the light guide plate, and the second light-transmitting holes have light-transmitting mediums; and a projection of each of the first light-transmitting holes and a projection of one of the second light-transmitting holes in a radial direction of the light guide strip overlap.

2. The light guide assembly according to claim 1, wherein the first end of the light guide strip is a light incident side, wherein:
   a plurality of the first light-transmitting holes are equally spaced in a light transmission direction of the light guide strip, and sectional areas of a plurality of the first light-transmitting holes in a direction parallel to the periphery of the light guide plate gradually increase in a direction away from the first end; or
   the sectional areas of a plurality of the first light-transmitting holes in a direction parallel to the periphery of the light guide plate are equal, and a distance between the first light-transmitting holes adjacent to each other in a light transmission direction of the light guide strip gradually decreases in a direction away from the first end.

3. The light guide assembly according to claim 1, wherein both the first end and the second end of the light guide strip are light incident sides, wherein:
   a plurality of the first light-transmitting holes are equally spaced in a light transmission direction of the light guide strip, and sectional areas of the first light-transmitting holes in a direction parallel to a periphery of the light guide plate gradually increase in a direction toward a middle point of the light guide strip; or
   the sectional areas of a plurality of the first light-transmitting holes in a direction parallel to the periphery of the light guide plate are equal, and a distance between the first light-transmitting holes adjacent to each other in a light transmission direction of the light guide strip gradually decreases in a direction toward the middle point of the light guide strip.

4. The light guide assembly according to claim 1, wherein the light-transmitting medium of the light-transmitting part is a gas medium or a solid medium, the light-transmitting mediums of the first light-transmitting holes are gas mediums or solid mediums, and the light-transmitting mediums of the second light-transmitting holes are gas mediums or solid mediums.

5. The light guide assembly according to claim 1, wherein the light-transmitting mediums of the light-transmitting part, the first light-transmitting holes, and the second light-transmitting holes are the same solid medium.

6. The light guide assembly according to claim 1, wherein the first light-transmitting holes and the second light-transmitting holes are strip-shaped holes, and an extension direction of a length of the strip-shaped hole is perpendicular to a plane of the light guide plate.

7. The light guide assembly according to claim 1, wherein there are zig-zag notches on the surface of the light guide plate facing to the light guide strip, and an extension direction of the zig-zag notches is perpendicular to a plane of the light guide plate.

8. The light guide assembly according to claim 1, wherein the light-transmitting mediums of the light-transmitting part, the first light-transmitting holes, and the second light-transmitting holes are solid mediums, the light-transmitting mediums of the second light-transmitting holes have zig-zag notches on the surface close to one side of the light guide plate, and an extension direction of the zig-zag notches is perpendicular to a plane of the light guide plate.

9. The light guide assembly according to claim 1, wherein the light-transmitting mediums of the light-transmitting part, the first light-transmitting holes, and the second light-transmitting holes are solid mediums, the light-transmitting mediums of the second light-transmitting holes have zig-zag notches on the surface close to one side of the light guide plate, the surface of the light guide plate facing to the light guide strip also has zig-zag notches, an extension direction of the zig-zag notches is perpendicular to a plane of the light guide plate, and the zig-zag notches of the second light-transmitting holes and the zig-zag notches of the light guide plate are opposite to one another in a concave-convex manner.

10. The light guide assembly according to claim 1, wherein a side of the light guide strip facing to one side of the light guide plate is a plane and closely attaches to a side wall of the light guide plate.

11. The light guide assembly according to claim 1, wherein the light guide plate has a through hole.

12. A light source module, comprising:
   a light source; and
   a light guide assembly, comprising:
   a light guide plate; and
   a light guide strip positioned around a periphery of the light guide plate and having a first end and a second end, a plurality of light-transmitting holes being formed on one side of the light guide strip facing to the light guide plate; wherein:

at least one of the first end and the second end is a light incident side;

the light guide strip is annular, and a shape of the light guide strip is the same as a shape of the periphery of the light guide plate;

the light guide strip comprises:
- a light-transmitting part having a light-transmitting medium; and
- a reflective layer wrapping the light-transmitting part;
- wherein a plurality of the light-transmitting holes comprise a plurality of first light-transmitting holes on one side of the reflective layer facing to the light guide plate, and the first light-transmitting holes have light-transmitting mediums;

the light guide strip further comprises:
- a protective layer wrapping the reflective layer;
- wherein a plurality of the light-transmitting holes further comprise a plurality of second light-transmitting holes on one side of the protective layer facing to the light guide plate, and the second light-transmitting holes have light-transmitting mediums; and a projection of each of the first light-transmitting holes and a projection of one of the second light-transmitting holes in a radial direction of the light guide strip overlap;

the light source is on at least one end of the light guide strip; and a light-emitting direction of the light source faces the light guide strip.

13. A display device, comprising:
a display panel; and
a light source module comprising a light source and a light guide assembly, wherein the light guide assembly comprises:
a light guide plate; and
a light guide strip positioned around a periphery of the light guide plate and having a first end and a second end, a plurality of light-transmitting holes being formed on one side of the light guide strip facing to the light guide plate, wherein:

at least one of the first end and the second end is a light incident side;

the light guide strip is annular, and a shape of the light guide strip is the same as a shape of the periphery of the light guide plate;

the light guide strip comprises:
- a light-transmitting part having a light-transmitting medium; and
- a reflective layer wrapping the light-transmitting part;
- wherein a plurality of the light-transmitting holes comprise a plurality of first light-transmitting holes on one side of the reflective layer facing to the light guide plate, and the first light-transmitting holes have light-transmitting mediums;

the light guide strip further comprises:
- a protective layer wrapping the reflective layer;
- wherein a plurality of the light-transmitting holes further comprise a plurality of second light-transmitting holes on one side of the protective layer facing to the light guide plate, and the second light-transmitting holes have light-transmitting mediums; and a projection of each of the first light-transmitting holes and a projection of one of the second light-transmitting holes in a radial direction of the light guide strip overlap;

the light source is on at least one end of the light guide strip; and a light-emitting direction of the light source faces the light guide strip.

14. The display device according to claim 13, wherein:
the display panel is a total reflective display panel, a semi-reflective and semi-transparent display panel, or a transparent display panel; and
the display panel comprises an array substrate, a liquid crystal layer, and a color film substrate sequentially stacked, and the light guide plate covers one side of the color film substrate away from the liquid crystal layer.

15. The display device according to claim 13, wherein the display panel is an electronic paper display panel.

* * * * *